Figure 1:
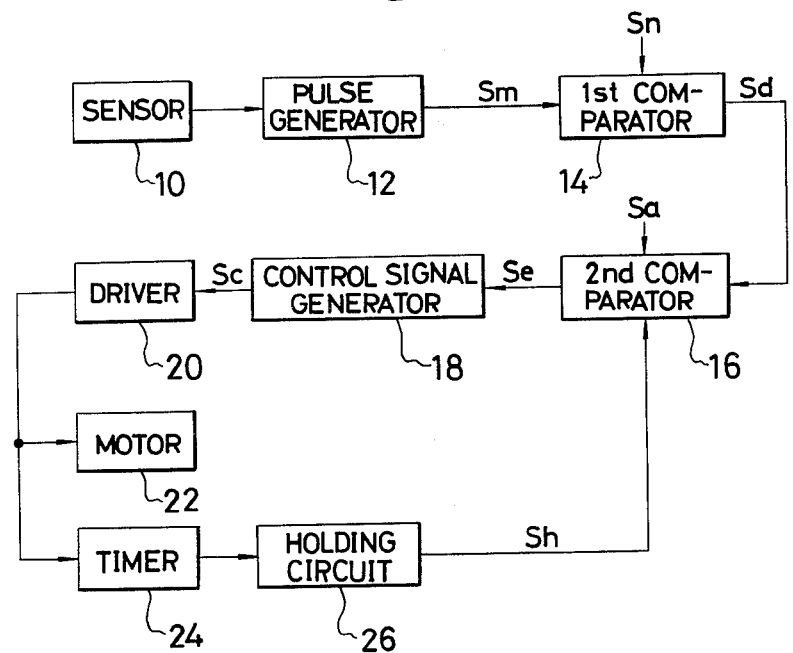

United States Patent [19]

Yagi et al.

[11] 3,906,238

[45] Sept. 16, 1975

[54] SIZE CONTROL DEVICE FOR CONTINUOUSLY PRODUCED ELONGATE OBJECT

[76] Inventors: Eigo Yagi, 27-12,3-chome, Wakabaya, Setagawa; Keiichi Shiraishi, 44-8,5-chome, Kameido, Kotoh, both of Tokyo, Japan

[22] Filed: May 28, 1974

[21] Appl. No.: 474,110

[30] Foreign Application Priority Data
May 30, 1973 Japan................................ 48-59742
May 30, 1973 Japan................................ 48-59743

[52] U.S. Cl. ............... 250/548; 250/560; 250/571; 250/516; 425/377; 356/159
[51] Int. Cl.² ......................................... G01N 21/30
[58] Field of Search ........... 250/548, 559, 571, 239, 250/216, 237 G; 425/141, 445, 66, 377, DIG. 17; 356/159, 160

[56] References Cited
UNITED STATES PATENTS

| | | | |
|---|---|---|---|
| 2,897,722 | 8/1959 | Gunter, Jr. et al. | 250/216 X |
| 3,150,213 | 9/1964 | Doering | 425/377 X |
| 3,265,786 | 8/1966 | Voelker | 425/377 X |
| 3,432,671 | 3/1969 | Edmonds | 250/552 |
| 3,643,101 | 2/1972 | Shipp et al. | 250/216 |
| 3,812,348 | 5/1974 | Lippke | 250/572 X |
| 3,831,031 | 8/1974 | Barrett et al. | 250/237 G |

*Primary Examiner*—Walter Stolwein
*Attorney, Agent, or Firm*—Waters, Schwartz & Nissen

[57] ABSTRACT

A size control device for use in an extrusion molding machine, comprising an opto-electric position sensor for measuring the cross-sectional size of an extruded material and producing an electric signal representative of the measured cross sectional size of the extruded material. Circuitry is arranged to increase or decrease the draw-off rate of the extruded material through detection of an amount of deviation of the cross-sectional size of the extruded material from a prescribed normal size. The opto-electric position sensor is characterized by a light-emitting unit adapted to project a collimated beam of parallel rays of light and a light-sensitive unit for receiving the beam of light. The light-sensitive unit is formed with a pinholed camera obscura so that, if an object such as the extruded material is positioned between the two units and intercepts the beam of light, an inverted image faithfully following the contour of the object is produced in the pinholed camera obscura.

7 Claims, 2 Drawing Figures

SIZE CONTROL DEVICE FOR CONTINUOUSLY PRODUCED ELONGATE OBJECT

The present invention relates to a size control device which is expecially advantageous for use in an extrusion molding machine to maintain external dimensions of an extrusion molded product within allowable ranges.

The conventional type of extrusion molding machine used for the extrusion of a thermoplastic material or a synthetic rubber usually consists of an extrusion die formed with an orifice through which a heat-plastified thermoplastic material or synthetic rubber is continuously extruded into the form of a rod, tube or sheet having a designed cross-section. The material thus formed is passed through a suitable cooling unit such as a water bath and is thereby cooled and set into a desired final configuration. The material is thereafter wound or otherwise stored, either temporarily or finally, on a take-up device by means of a suitable draw-off arrangement or, where the extrusion molding process is combined with a blow molding operation, expanded into a tubular form as the extruded material is being conveyed away from the extrusion die.

It sometimes happens in such an extrusion molding process that the cross-sectional size of the material continuously extruded from the die fluctuates from prescribed ones during operation primarily because of an inconsistency that may be created between the extrusion rate and the rate of conveying the extruded material from the die due to frictional forces which are imparted to the heat-plastified material flowing in the extrusion die. The change in the cross sectional size of the extruded material may also be invited by reason of variation in the temperatures of ambient air, water in the cooling bath and/or the supplied thermoplastic or rubber material, fluctuation in the proportions of the constituents and the density of the supplied material, and/or shocks and vibrations which may be transferred to or produced in the extrusion molding machine during operation. Correction of the cross-sectional size of the extruded material is therefore made by changing the rate of conveying of the extruded material from the die through detection of the fluctuation in the cross-sectional size of the extruded material. One typical method of changing the draw-off rate of the extruded material is to have the draw-off rate increased to reduce the cross-sectional area of the extruded material when the cross-sectional size of the extruded material is increased or is about to be increased beyond a prescribed upper limit and to have the draw-off rate diminished to enlarge the cross-sectional area of the extruded material when the cross-sectional size of the extruded material is decreased or is about to be decreased beyond a prescribed lower limit. The cross-sectional or external size of an extruded product can thus be controlled by regulating the conveying rate of the extruded material through detection of the change in the cross-sectional or external dimensions of the material extruded.

An object of the present invention is to provide a device which is adapted to control the cross-sectional size of, for example, an extruded material.

As will be understood from the description to follow, the size control device according to the present invention is characterized, among other things, by an opto-electric scanning means which is adapted to optically scan the extruded material for producing an optical signal representative of the cross-sectional size of the scanned material and to convert the optical signal into an electrical signal. Various types of position sensors of the opto-electrically operating nature may be applicable to the scanning means thus arranged. A typical example of the prior art opto-electric position sensors is made up of a light-emitting unit for projecting a collimated beam of light and a light-sensitive unit to receive the beam of light for producing an electrical output when irradiated with the beams of light. The light-emitting and light-sensitive units are positioned to have a common optical axis and, when an object to be measured is located on the optical axis between the two units, the beam of light is intercepted by the object so that the light sensitive unit produces an electric signal which is indicative of the presence of the object at the particular position. If, thus, the object to be measured is moved perpendicularly to the optical axis of the units or, conversely, the units are moved together relative to the object, the light sensitive unit will continue to produce the electric signal during a period of time in which the light beam projected from the light-emitting unit is intercepted by the object. The duration of the electric signal produced by the light-sensitive unit is thus representative of the size of the object in a direction in which the object has been moved relative to the position sensor. In order to achieve satisfactory accuracy of the size of the object thus determined, it is important that the beams of light projected from the light-emitting unit be accurately collimated to produce a clear-cut image on the light-sensitive unit and that the light-sensitive unit be free from irregular reflection of light.

Another object of the present invention is, therefore, to provide an improved opto-electric position sensor which is adapted to achieve an increased resolving power and which is free from irregular reflection of light.

The size control device according to the present invention has been assumed to be applied to an extrusion molding machine but may be utilized, in general, for controlling the cross-sectional size of a non-transparent elongate object which is continuously produced and conveyed in a predetermined path. In accordance with the present invention, the size control device comprises, in combination, opto-electric scanning means consisting essentially of a light-emitting unit having a predetermined optical axis and operative to emit a collimated beam of light on the optical axis and a light-sensitive unit which has an optical axis substantially in line with the optical axis of the light-emitting unit and which is spaced apart from the light-emitting unit in a direction parallel with the aligned optical axes of the units, the light-sensitive unit comprising a dark chamber formed with a pinhole aligned with the optical axis of the light-sensitive unit and a light-sensitive semiconductor element located behind the pinhole and in alignment with the optical axis of the light-sensitive unit for producing an electric current when irradiated with the beam of light from the light-emitting unit through the pinhole, the light-emitting and light-sensitive units being movable together in direction substantially perpendicular to the optical axes thereof with the path of the object extending intermediate the two units and substantially perpendicular to the optical axes of the units so that the collimated beam of light emitted from the light-emitting unit toward the light-sensitive unit is intercepted by and in the presence of the object on the optical axes of the units and an electrical signal representative of the cross-sectional size of the object intercepting the beam of light is produced from the light-sensitive unit, a first comparator circuit for comparing the signal from the scanning means with a first reference signal representative of a predetermined cross sectional size of the object for producing an output signal representative of a deviation between the detected and prescribed cross-sectional sizes of the object, a second comparator circuit for comparing the output signal of the first comparator circuit with a second reference signal representative of a prescribed allowable range of deviation of the detected cross-sectional size of the object for passing therethrough the output signal of the first comparator circuit when the detected cross-sectional size of the object falls outside the prescribed allowable range, a control signal generating circuit responsive to the output signal from the second comparator circuit for producing a control signal having a duration representative of the deviation between the detected and prescribed cross-sectional sizes of the object, and drive means triggered by the control signal from the control signal generating circuit for changing a rate of conveying the object for a period of time corresponding to the duration of the control signal.

The size control device may further comprise a timing circuit which is connected to an output terminal of the control signal generating circuit for producing an output signal having a predetermined duration in response to the control signal delivered from the control signal generating circuit and a holding circuit having an input terminal connected to an output terminal of the timing circuit and an output terminal connected to the second comparator circuit for holding the second comparator circuit in a locked condition for a time interval which is equal to the duration of the output signal from the timing circuit so that the delivery of the output signal from the second comparator circuit to the control signal generator is interrupted for such a time interval.

Figure 2:
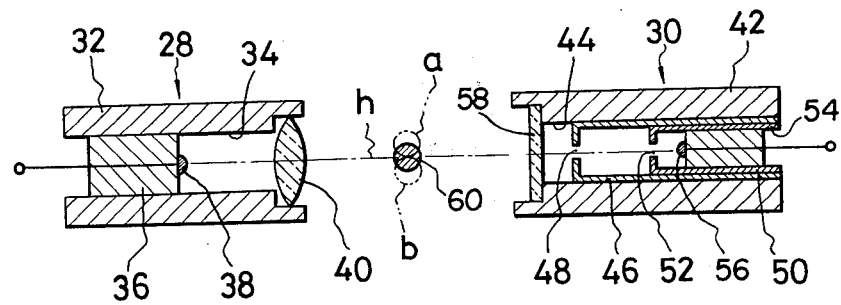

The features and advantages of the size control device according to the present invention will become more apparent from the following description taken in conjunction with the accompanying drawing, in which:

FIG. 1 is a block diagram showing a preferred embodiment of the size control device according to the present invention; and FIG. 2 is a longitudinal sectional view which schematically illustrates a preferred embodiment of the opto-electric position sensor incorporated into the size control device shown in FIG. 1.

As previously mentioned, the size control device according to the present invention is intended to control the external or cross-sectional size of a non-transparent elongate object such as, for example, a extruded extruded from a plastics or rubber extrusion molding machine. As is well known in the art, the extrusion molding machine consists of an extrusion head having a die which is formed with an extrusion orifice of a suitable configuration. The thermoplastic material or synthetic rubber to be extruded is preheated and rendered into a heat-plastified state while it is being supplied to the die. The heat-plastified thermoplastic or synthetic rubber material is continuously extruded from the extrusion orifice in the die into the form of a rod, tube or sheet and the material thus extruded is conveyed away from the die at a constant rate by means of a suitable draw-off device. Since the construction and operation of the extrusion molding machine of this nature are well known in the art and are rather immaterial for the understanding of the present invention, no further details thereof will be herein described.

In the present context, however, it is assumed that the draw-off device of the extrusion molding machine comprises draw-off rollers for conveying the extruded material from the die, a motor for driving the draw-off rollers, and control means such as a reduction gear mechanism to control the revolution speed of the motor. The size control device according to the present invention may thus be associated with the control means of the draw-off device so that the revolution speed of the motor and accordingly the rate of the draw-off extruded material conveyed by the draw-off rollers are controlled in accordance with change in the detected cross-sectional size of the extruded material.

Referring to FIG. 1 of the drawing, the size control device embodying the present invention comprises a position sensor 10 which is adapted to scan, in an optical fashion, an extruded material (not shown) being conveyed in a predetermined path away from an extrusion die (not shown) and to produce an electric signal which is representative of the detected cross-sectional size of the scanned extruded material. The position sensor 10 has an output terminal connected to an input terminal of a pulse generator 12 which produces an output signal $Sm$ from the signal fed from the position sensor 10. The signal $Sm$ or, in other words, the number of pulses constituting the signal $Sm$ is thus representative of the detected cross-sectional size of the extruded material which has been scanned by the position sensor 10. The output signal $Sm$ delivered from the pulse generator 12 is supplied to a first comparator circuit 14 to which is constantly applied a reference signal $Sn$ which is representative of a prescribed or desired normal cross sectional size of the extruded material. The signal $Sm$ fed from the pulse generator 12 is thus compared with the reference signal $Sn$ by means of the first comparator circuit 14, which accordingly produces an output signal $Sd$ representing a difference between the two input signals $Sm$ and $Sn$ impressed on the first comparator circuit 14. The output signal $Sd$ from the first comparator circuit 14 is in the form of pulses of a number which is in agreement with an amount of deviation, if any, of the detected cross-sectional size of the scanned extruded material from the desired normal cross-sectional size of the extruded material. The pulses thus delivered from the first comparator circuit 14 may be of the positive polarity if the detected cross-sectional size of the extruded material is larger than the prescribed normal size and may be of the negative polarity if the detected cross-sectional size of the extruded material is short of the prescribed normal size. The output signal $Sn$ thus delivered from the first comparator circuit 14 is fed to a second comparator circuit 16 which is supplied with a reference signal $Sa$ representative of a predetermined allowable range of deviation of the detected cross-sectional size of the extruded material from the prescribed normal size. The second comparator circuit 16 is adapted to compare the signal $Sd$ with the reference signal $Sa$ and is held inoperative if the number of pulses of the signal $Sd$ falls within the predetermined allowable range of deviation represented by the reference signal $Sa$. If, however, the amount of deviation of the detected cross-sectional size of the extruded material scanned by the position sensor 10 is larger than the predetermined allowable range, then the second comparator circuit 16 is operative to produce an output signal Se which is identical with the output signal Sd delivered from the first comparator circuit 14 and which is accordingly representative of the amount of deviation of the detected cross-sectional size of the extruded material from the prescribed normal size. The output signal Se of the second comparator circuit 16 is fed to a control signal generator 18 which produces a control signal Sc having a duration which corresponds to the amount of deviation of the detected cross-sectional size of the extruded material from the prescribed normal size dictated by the reference signal Sn on the first comparator circuit 14. The control signal Sc thus produced from the control signal generator 18 is supplied through a suitable driver circuit 20 (which may include a relay) to a motor 22 to drive the draw-off means to draw the extruded material from the extrusion die. Where the draw-off means includes a reduction gear mechanism adapted to vary the rotational speed of the motor 10, the control signal Sc may be supplied to an actuator (not shown) of such a reduction mechanism. The rotational speed of the motor 10 is in this manner increased or decreased by means of the control signal Sc depending upon the amount of deviation of the detected cross-sectional size of the extruded material from the prescribed normal size of the material until such a deviation is eliminated. Since the result of the correction of the cross-sectional size of the extruded material is actually achieved in a certain time interval after the control signal Sc has been initially delivered from the control signal generator 20, it is preferable that the control signal Sc be maintained unchanged until the change of draw-off rate of the extruded material is complete. For this purpose, the size control device embodying the present invention further comprises a timing circuit 24 having an input terminal connected to the output terminal of the driver circuit 20 and a holding circuit 26 having an input terminal connected to an output terminal of the timing circuit 24 and an output terminal connected to the second comparator circuit 16. When, thus, the control signal Sc is delivered from the control signal generator 18 so that the correction of the cross-sectional size of the extruded material is commenced, the timing circuit 24 is actuated and held in a condition producing an output signal for an interval which is prescribed on the timing circuit 24. The holding circuit 26 is triggered by the output signal from the timing circuit 24 and supplies an output signal Sh to the second comparator circuit 16. The second comparator circuit 16 is consequently held in a locked condition and accordingly the motor 22 is kept controlled by the control signal Sc from the control signal generator 18 irrespective of the signal Sd being supplied from the first comparator 14. When the correction of the cross-sectional size of the extruded material is complete and the output signal Sh of the holding circuit 26 disappears upon lapse of the time interval prescribed on the timing circuit 24, the second comparator 16 becomes responsive to the output signal Sd from the first comparator circuit 14 and is allowed to produce a new output signal Se if further correction is required of the cross-sectional size of the extruded material. The cross-sectional size of the extruded material is thus controlled in such a manner that the amount of deviation of the detected size of the extruded material is limited within the allowable range prescribed on the second comparator circuit 16.

FIG. 2 illustrates a preferred example of the opto-electric position sensor 10 which is incorporated into the size control device thus far described. Referring to FIG. 2, the position sensor comprises a light-emitting unit 28 and a light-sensitive unit 30. The light-emitting and light-sensitive units 28 and 30 have a common optical axis $h$ and are spaced apart from each other in a direction parallel to the optical axis $h$. The light-emitting unit 28 comprises a cylindrical casing 32 having an axial bore 34, a support member 36 received in the bore 34, and a light-emissive semiconductor element 38 which is mounted on a front end face of the support member 36 and which is aligned with the optical axis $h$ of the units 28 and 30. A condensing lens 40 may be located at a foremost end of the casing 32 as shown. On the other hand, the light-sensitive unit 30 comprises a cylindrical casing 42 having an axial bore 44, an outer tubular member 46 received in the bore 44 and having a front end wall formed with a pinhole 48, an inner tubular member 50 received in the outer tubular member 46 and having a front end wall axially spaced apart from the front end wall of the outer tubular member 46 and formed with an aperture 52, a support member 54 received in the inner tubular member 50, and a light-sensitive semiconductor element 56 mounted on a front end face of the support member 54. The pinhole 48 in the front end wall of the outer tubular member 46, the aperture 52 in the front end wall of the inner tubular member 50 and the light-sensitive semiconductor element 56 on the support member 54 are all located on the optical axis $h$ of the light-emitting and light-sensitive units 28 and 30, as shown. Where desired, a transparent plate 58 of, for example, glass may be located at a foremost end of the casing 42 for preventing ingress of dust and moisture into the interior of the casing 42. The light-emissive semiconductor element 38 is electrically connected to a source (not shown) of a d.c. power and emits a collimated beam of light on the optical axis $h$. The beam of light incident on the light-sensitive unit 30 reaches the light-sensitive semiconductor element 56 through the pinhole 48 in the front end wall of the outer tubular member 46 and the aperture 52 in the front end wall of the inner tubular member 50. When irradiated with the beam of light, the light-sensitive semiconductor element 56 produces an electric current of an intensity dictated by the intensity of the light incident thereon. The light-sensitive semiconductor element 56 is electrically connected to an external electric circuit such as the pulse generator 12 illustrated in FIG. 1. Examples of the light-emissive and light-sensitive semiconductor elements 38 and 56 above mentioned are a light-emissive diode and a photo-transistor, respectively.

A pinholed camera obscura 46a is thus constituted by the outer tubular member 46 in the light-sensitive unit 30. When an object to be measured is positioned on the optical axis $h$ between the light-emitting and light sensitive units 28 and 30 as indicated at 60 in FIG. 2, the beam of light projected from the light-emitting unit 28 is intercepted by the object 60 so that an inverted image of the object 60 will be produced at the light-sensitive semiconductor element 56 as is well known in the art of pinhole cameras. The light-sensitive semiconductor element 56 responds to the image thus produced thereon and is disabled from producing the output current in the presence of the object 60 on the optical axis $h$ between the units 28 and 30. If, therefore, the object 60 to be measured is held stationary and the light-emitting and light-sensitive units 28 and 30 are moved perpendicularly to the optical axis $h$ at a constant velocity then the beam of light will be kept intercepted by the object 60 and accordingly the light-sensitive semiconductor element 56 held inactivated for an interval which corresponds to the size of the object 60 in a direction perpendicular to the optical axis $h$. If, thus, the light-emitting and light-sensitive units 28 and 30 are moved together in direction perpendicular to the optical axis $h$ so that the beam of light emanating from the light-emitting unit is caused to travel laterally while the object 60 to be measured is being longitudinally conveyed perpendicularly to the beam of light, the object 60 will intercept the beam of light at a leading end of its cross-section as indicated at $a$ in FIG. 2 so that the light-sensitive semiconductor element 56 starts to produce an electric signal. As the light-emitting and light-sensitive units 28 and 30 are further moved relative to the object 60 being longitudinally conveyed so that the object 60 has the trailing end $b$ of its cross-section separated from the beam of light, the inverted image of the object 60 disappears from the light-sensitive semiconductor element 56 and the beam of light from the light-emitting unit 28 is allowed to reach the light-sensitive semiconductor element 56. The light-sensitive semiconductor element 56 is thus made operative to produce an output current and is accordingly disabled from delivering the electrical signal. The cross-sectional size of the object 60 which may be the material extruded from an extrusion molding machine can therefore be determined from the velocity of movement of the units 28 and 30 relative to the object 60 and the period of time for which the object 60 has intercepted the beam of light from the light-emitting unit 28. The apertured inner tubular member 50 is intended to improve the directivity of the beam of light incident on the light-sensitive semiconductor element 56 and may therefore be dispensed with if desired. The light-emitting and light-sensitive units 28 and 30 may be arranged to be movable toward and away from each other in directions parallel to the optical axis $h$ so that the image produced in the pinholed camera obscura may be expanded or reduced.

In contrast to the prior art position sensors in which optical images of objects to be measured are produced by lens systems which are causative of chromatic and spherical aberration, the image produced on the light-sensitive semiconductor element 56 by the pinhole effect of the camera obscura is identical in configuration with the object 60 to be measured and, for this reason, the external dimensions of the object to be measured can be accurately detected irrespective of the distance between the object and the light-sensitive unit 30. Experiments have revealed that the position sensor herein proposed is capable of achieving a measuring accuracy of the order of 1/100 millimeter. Since, moreover, the external dimensions of the object to be measured can be detected without direct contact with the object, the size of a soft or even amorphous material can be measured by the position sensor incorporated into the size control device according to the present invention.

What is claimed is:

1. A size control device for an extrusion molding machine in which an extruded material is drawn by draw-off means, comprising an opto-electric scanning means for optically scanning the extruded material and producing an electrical signal representative of a cross-sectional size of the scanned extruded material, a first comparator circuit for comparing the signal from the scanning means with a first reference signal representative of a predetermined cross-sectional size of the extruded material for producing an output signal representative of an amount of deviation of the detected cross-sectional size of the scanned extruded material from the predetermined cross-sectional size, a second comparator circuit for comparing the output signal of the first comparator circuit with a reference signal representative of a prescribed allowable range of deviation of the detected cross-sectional size of the extruded material from the predetermined cross-sectional size for passing therethrough the output signal of the first comparator circuit when the detected cross-sectional size of the scanned extruded material falls outside the prescribed allowable range, a control signal generating circuit responsive to the output signal passed from the second comparator circuit for providing a control signal having a duration which is representative of the amount of deviation of the detected cross-sectional size of the scanned extruded material, drive means triggered by said control signal for driving said draw-off means to change the rate of drawing the extruded material for an interval which corresponds to the duration of the control signal, and a timing circuit connected to an output terminal of said control signal generating circuit for producing an output signal having a predetermined duration in response to the control signal delivered from the control signal generating circuit, and a holding circuit having an input terminal connected to an output terminal of the timing circuit and an output terminal connected to said second comparator circuit for holding the second comparator circuit in a locked condition for a time interval which is equal to the duration of the output signal from the timing circuit so that the delivery of the output signal from the second comparator circuit to said control signal generating circuit is interrupted for said time interval.

2. A size control device for controlling the cross-sectional size of a non-transparent elongate object which is continuously produced and conveyed in a predetermined path, comprising, in combination, opto-electric scanning means consisting essentially of a light-emitting unit having a predetermined optical axis and operative to emit a collimated beam of light on the optical axis and a light-sensitive unit which has an optical axis substantially in line with the optical axis of the light-emitting unit and which is spaced apart from the light-emitting unit in a direction parallel with the aligned optical axes of the units, the light-sensitive unit comprising a dark chamber formed with a pinhole aligned with the optical axis of the light-sensitive unit and a light-sensitive semiconductor element located behind said pinhole and in alignment with the optical axis of the light-sensitive unit for producing an electric current when irradiated with the beam of light from said light-emitting unit through said pinhole, the light-emitting and light-sensitive units being movable together in direction substantially perpendicular to the optical axes thereof with said path of the object extending intermediate the two units and substantially perpendicularly to the optical axes of the units so that the collimated beam of light emitted from the light-emitting unit toward the light-sensitive unit is intercepted by and in the presence of the object on the optical axes of the units and an electric signal representative of the cross-sectional size of the object which has intercepted the beam of light is produced from the light-sensitive unit, a first comparator circuit for comparing the electric signal from said light-sensitive unit with a first reference signal representative of a predetermined cross-sectional size of the object for producing an output signal representative of an amount of deviation of the detected cross-sectional size of the object from the predetermined cross-sectional size, a second comparator circuit for comparing the output signal from the first comparator circuit with a second reference signal representative of a prescribed allowable range of deviation of the detected cross-sectional size of the scanned object from the predetermined cross-sectional size of the object for passing therethrough the output signal of the first comparator circuit when the detected cross-sectional size of the object falls outside the prescribed range, a control signal generating circuit responsive to the signal passed through the second comparator circuit for producing a control signal having a duration which is representative of the amount of deviation of the detected cross-sectional size of the scanned object from the predetermined cross-sectional size, and drive means operative to be triggered by said control signal for changing the rate of conveying the object in said path for a duration corresponding to the duration of the control signal.

3. A size control device as set forth in claim 2, in which said light-sensitive unit further comprises an apertured member having an aperture located on the optical axis of the light-sensitive unit and intermediate said pinhole and said light-sensitive semiconductor element.

4. A size control device as set forth in claim 2, in which said light-emitting unit comprises a light-emissive semiconductor element which is located on the optical axis of the light-emitting unit.

5. A size control device as set forth in claim 4, in which said light-emitting unit further comprises a condensing lens which is located intermediate said light-emissive semiconductor element and said light-sensitive unit.

6. A size control device as set forth in claim 2, in which said light-emitting and light-sensitive units are movable toward and away from each other in a direction parallel with the optical axes of the units.

7. A size control device as set forth in claim 2, further comprising a timing circuit connected to an output terminal of said control signal generating circuit for producing an output signal having a predetermined duration in response to the control signal delivered from said control signal generating circuit, and a holding circuit having an input terminal connected to an output terminal of said timing circuit and an output terminal connected to said second comparator circuit, said holding circuit being operative to hold the second comparator circuit in a locked condition responsive to the output signal from said timing circuit, said locked condition being maintained for a period of time equal to the duration of the output signal from the second comparator circuit whereby the delivery of the output signal from the second comparator circuit to said control signal generator is interrupted for said period of time.

* * * * *